United States Patent [19]

Cheatham et al.

[11] 4,188,649
[45] Feb. 12, 1980

[54] MAGNETIC HEAD HAVING A JAGGED-EDGED GAP, AND METHOD FOR PRODUCING SUCH HEAD

[75] Inventors: Samuel D. Cheatham, Arvada; Neil L. Robinson; Edmond W. Smathers, both of Boulder, all of Colo.

[73] Assignee: IBM Corporation, Armonk, N.Y.

[21] Appl. No.: 857,500

[22] Filed: Dec. 5, 1977

[51] Int. Cl.² ............................................. G11B 5/25
[52] U.S. Cl. ................................... 360/118; 360/119
[58] Field of Search .................. 360/118, 119–120, 360/127

[56] References Cited

U.S. PATENT DOCUMENTS

| | | | |
|---|---|---|---|
| 2,945,919 | 7/1960 | Neumann | 360/120 |
| 3,217,305 | 11/1965 | Hanson | 360/119 |
| 3,494,026 | 2/1970 | Sugaya | 360/120 X |
| 3,810,245 | 5/1974 | Ozawa et al. | 360/127 |

*Primary Examiner*—John H. Wolff
*Attorney, Agent, or Firm*—Thomas W. O'Rourke; Josh Cockburn; Robert E. Harris

[57] ABSTRACT

An AC magnetic erase head having improved AC erase characteristics, the magnetic head being formed of two half core elements of a magnetic material, preferably ferrite, defining an irregular edged or jagged-edged gap, and including a non-magnetic substance, preferably glass, within the gap. The magnetic head is preferably produced by thermally etching ferrite magnetic material forming the half core elements by means of relatively prolonged heat soak at an elevated temperature.

8 Claims, 2 Drawing Figures

MAGNETIC HEAD HAVING A JAGGED-EDGED GAP, AND METHOD FOR PRODUCING SUCH HEAD

BACKGROUND OF THE INVENTION

1. Field of the Invention

The present invention relates generally to heads for erasing signals imprinted upon a magnetic medium, and more particularly to an AC erase head having an irregular or jagged-edged gap defined therein. Further, the present invention relates to a preferred method of producing such magnetic head by thermally etching the ferrite material of half core elements defining the edges of the gap.

2. Description of the Prior Art

Magnetic heads, in general, are well known. There exists a great deal of expertise attendant thereto. Broadly, magnetic heads classically comprise a pair of half core elements defining a narrow gap therebetween. The half core elements are integrally joined, in most instances, or alternatively, connected by a yoke portion which confines the magnetic field between the core elements. Electrical windings are coupled to the core elements to induce a signal in the core.

Heretofore, the bulk of the art relating to magnetic heads have, in general, been concerned with recording heads and have suggested rather substantial efforts and involved processes to insure a smooth, regular edge at the surfaces defining the gap. Since it is necessary that the gap be filled with a non-magnetic material, preferably a solid such as a vitreous material, and since such vitreous materials often erode the more desirable of the materials for the half core elements such as ferrite, particular attention has been paid to grain direction, polishing, etc. in finishing the heads and defining the gap in order that smooth, regular edges may be produced.

U.S. Pat. No. 2,945,919 issued July 19, 1960 is typical of such prior art magnetic heads, and particularly is typical of the means employed to provide smooth gap surfaces. According to this teaching, the relatively rough ferrite surfaces which initially form the gap are covered with a layer of another ferromagnetic material which in turn is polished to provide the, according to the patent, desirable regular and smooth gap defining surfaces.

U.S. Pat. No. 3,810,245 issued May 7, 1974 discusses the ramifications of orienting ferrite single crystal materials in order to expose favorable crystal planes through which the crystal may be cut or ground to provide smoother surfaces.

In summary, magnetic heads have heretofore been troubled with occasional minor roughness at the gap surfaces, but procedures have been developed to obviate this shortcoming and to provide a smooth, regular gapped surface.

SUMMARY OF THE INVENTION

The present invention, which provides a heretofore unavailable means for producing AC magnetic erase heads having improved characteristics, preferably involves a purposeful roughing of the surfaces defining the gap of the magnetic head, most preferably by thermal etching. More specifically, the present invention provides a magnetic erase head having irregular or jagged-edged surfaces defining the gap of the magnetic head in order that a more complete neutralization of residual signals in media may be obtained. Other than the nature of the gap forming surfaces, i.e., irregular and jagged, the magnetic erase heads of the instant invention substantially follow the conventional teachings of the prior art. However, with regard to the nature of the surface defining the gap, the instant invention is quite contrary to the teachings of the prior art.

Accordingly, an object of the present invention is to provide a new and improved magnetic erase head for more complete neutralization of magnetic recording media moved past the head.

Another object of the present invention is to provide a new and improved method for producing improved magnetic erase heads.

These and other objects of the invention will become apparent from the following drawings.

DETAILED DESCRIPTION OF THE INVENTION

Figure 1:
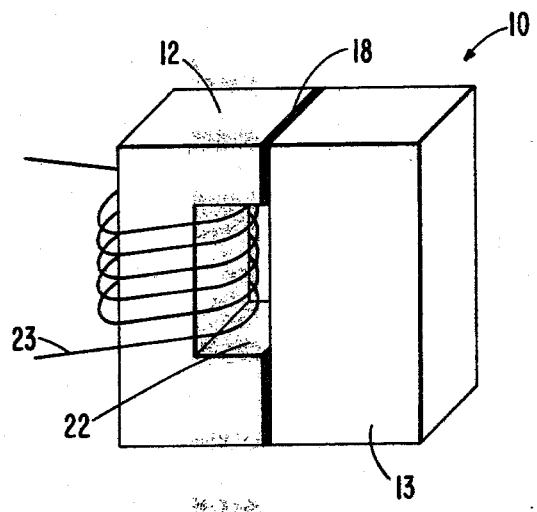
FIG. 1 is a simplified perspective view of a magnetic erase head in accord with the instant invention illustrating the half core elements defining the gap.
Figure 2:
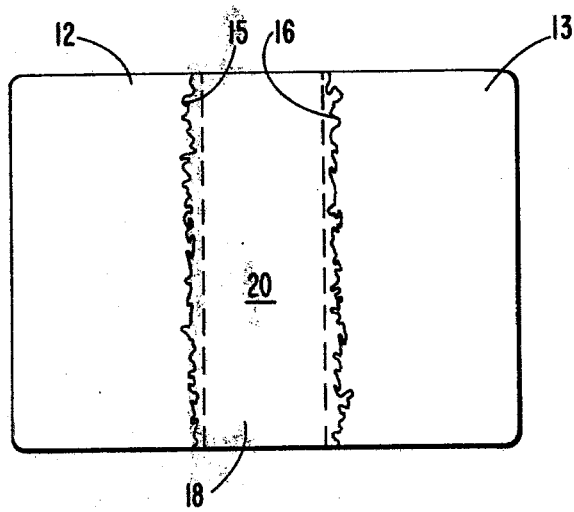
FIG. 2 is an enlarged and exaggerated view of the surfaces defining the gap.

Turning now to the drawings, wherein like components are designated by like reference numerals throughout the two figures, a magnetic erase head in accord with the instant invention is illustrated in FIG. 1 and generally designated by reference numeral 10. Magnetic erase head 10 is formed of first and second half core elements 12 and 13, respectively. Half core elements 12 and 13 have defined thereon surfaces 15 and 16 which, at the end portions thereof, define gap 18. Non-magnetic material 20, shown in FIG. 2, is disposed within gap 18 and closely engages surfaces 15 and 16 of half core elements 12 and 13. A winding window 22 is defined in half core element 12 and receives winding 23 in a conventional manner. Other magnetic head configurations are of course also operable with the instant invention.

Preferably, half core elements 12 and 13 are formed of ferrite and non-magnetic material 20 within gap 18 is a vitreous material such as glass. However, other well known materials, such as permalloy, a magnetic alloy primarily comprised of iron and nickel, and mu metal are suitable to form half core elements 12 and 13, and non-magnetic material 20 may be silicon monoxide, silicon dioxide, aluminum oxide or air.

As shown in FIG. 2, gap 18 is defined by surfaces 15 and 16 which in turn are very irregular or jagged. It has been found that such jagged surfaces substantially reduce residual magnetism in magnetic media which is AC erased utilizing magnetic erase head 10. This is of particular importance when employing high density recording on high coercivity media.

Preferably, magnetic use erase head 10 is formed by thermally etching half core elements 12 and 13 of polycrystalline ferrite. Essentially, such thermal etching involves heating the half core elements to an elevated temperature, i.e., 900° C. to 1000° C., maintaining the half core elements 12 and 13 at such elevated temperature for a substantial length of time, i.e., 30 minutes to 3 hours while maintaining a non-magnetic material 20 in the form of a glass within gap 18. In addition to the thermal etching resulting from the elevated temperature and extended time, such non-magnetic glass materials erode the ferrite material. Gap 18 may be of varying dimensions; but it is preferred that the surface roughness of surfaces 15 and 16 be at least of about 5% of the gap width, and most preferably greater than about 10% of the gap width. Typically, gap 18 is 10 to 15 microns and the surface roughness on the order of 1 to 2 microns, though substantial variations may occur over the surfaces.

EXAMPLE

Two half core elements of ferrite were positioned to form a gap of approximately 14 microns with glass disposed therebetween. The assembly was heated to about 920° C. and maintained at that temperature for about two hours. Thereafter, the assembly was cooled at the rate of substantially ¼° C. per minute until cooled to 300° C. Upon microscopic inspection, it was noted that the grain structure of the ferrite at the portion forming the gap had etched substantially to form an irregular, jagged surface. The roughness was noted to be undercut in portions. A wire winding was included and the magnetic head employed to erase magnetic material utilizing a sinusoidal AC erase of adjustable magnitude. An essentially identical magnetic head with conventional smooth surfaces defining the gap was utilized as a control under substantially identical conditions. The following results were obtained:

Table

| Density KFCI | Readback Signal | | Percent Improvement |
|---|---|---|---|
| | Conventional Magnetic Head | Improved Magnetic Head | |
| 1 | 25 Millivolts | 25 Millivolts | 0 |
| 3 | 24 | 24 | 0 |
| 5 | 21.5 | 21 | 2.3 |
| 10 | 12.8 | 12 | 6.3 |
| 15 | 7.0 | 6 | 14.3 |
| 20 | 3.8 | 3.1 | 18.4 |
| 30 | 1.5 | .9 | 40.0 |
| 40 | .4 | .2 | 50.0 |

It is to be noted that under high density recording greatly improved erase performance, i.e., a substantially lower readback signal, was obtained with the head of the instant invention compared to that of the conventional erase head.

In summary, the instant invention involves a magnetic erase head having substantially enhanced erase characteristics under AC erase conditions, particularly when employed with high coercivity media having high density recording thereon. The magnetic head may be conventionally configured, i.e., a narrow gap between half core elements and employ known magnetic materials with the critical exception that the surfaces defining the gap must be jagged and irregular. While it is contemplated that such a configuration could be produced by a number of means, it is particularly preferred that the half core elements be a ferrite material and that the jagged edges or surfaces be produced by relatively conventional steps under unconventional conditions, i.e., elevated temperature for extended periods.

Although, in view of the wide use to which the present invention can be put, only limited embodiments of the invention have been described for purposes of illustration, it is, however, anticipated that various changes and modifications will be apparent to those skilled in the art, and that such changes and modifications may be made without departing from the scope of the invention as defined by the following claims.

What is claimed is:

1. A magnetic erase head for erasing magnetic information on a length of magentic media, the magnetic erase head comprising:
   a first half core element of magnetic material and having defined thereon a first surface;
   a second half core element of magnetic material and having defined thereon a second surface;
   the first and second surfaces being positioned in an adjacent but spaced apart relationship to define a gap between the first and second half core members;
   the first and second surfaces being irregular and jagged with a surface roughness greater than 0.5 microns at the portions thereof defining the gap; and
   a non-magnetic material filling the gap;
   whereby an erase head formed of surfaces initially of a relatively smooth configuration and thereafter made irregular and jagged with a surface roughness greater than 0.5 microns is provided to erase magnetic information from an adjacent moving magnetic media.

2. A magnetic erase head as set forth in claim 1 in which the first and second half core members are formed of ferrite.

3. A magnetic erase head as set forth in claim 1 in which the non-magnetic material is glass.

4. A magnetic erase head as set forth in claim 1 in which the gap is of a width between about 10 microns and about 15 microns, and the surface roughness of the first and second surfaces at the jagged portions thereof is greater than about 5% of the gap width.

5. A magnetic erase head as set forth in claim 1 in which the surface roughness of the first and second surfaces is greater than about 10% of the gap width.

6. In a magnetic erase head having first and second half core elements each having surfaces in juxtaposition to each other to define a gap therebetween with a non-magnetic material disposed within the gap, the improvement comprising configuring surfaces defining the gap in an irregular and jagged fashion with a surface roughness of greater than 0.5 microns and of materials with induced surface roughness from an initially smoother surface.

7. A magnetic erase head as set forth in claim 6 in which the irregular and jagged surfaces defining the gap are of a surface roughness greater than about 5% of the gap width.

8. A magnetic erase head as set forth in claim 6 in which the gap is between about 10 microns and about 15 microns, and the irregular and jagged surfaces defining the gap are of a surface roughness of about 1 micron to about 2 microns.

* * * * *